United States Patent [19]

Lopresti

[11] Patent Number: 4,641,522

[45] Date of Patent: Feb. 10, 1987

[54] BEARING-LESS POSITIVE DISPLACEMENT FLOWMETER

[76] Inventors: William J. Lopresti, 15935 Natting Hill Dr., Lutz, Fla. 33549

[21] Appl. No.: 719,418

[22] Filed: Apr. 3, 1985

[51] Int. Cl.$^4$ .............................................. G01F 3/10
[52] U.S. Cl. ...................................................... 73/261
[58] Field of Search .................... 73/253, 261, 861.77; 417/420; 418/206

[56] References Cited

U.S. PATENT DOCUMENTS

| 294,026 | 2/1984 | Fitts . | |
|---|---|---|---|
| 1,996,672 | 9/1935 | Busch | 73/263 |
| 2,117,922 | 5/1938 | Terrell, Jr. | 73/261 |
| 2,190,006 | 2/1940 | Bassett | 73/261 |
| 2,383,226 | 8/1945 | Swindle | 73/261 |
| 3,069,907 | 12/1962 | Eddy . | |
| 3,457,835 | 7/1969 | Siebold . | |
| 3,685,353 | 8/1972 | Gestler et al. . | |
| 3,710,623 | 1/1973 | Boyd et al. . | |
| 4,210,410 | 7/1980 | Ohtani . | |
| 4,295,369 | 10/1981 | Wenlboe . | |
| 4,329,130 | 5/1982 | Nagata et al. . | |
| 4,409,829 | 10/1983 | Weber . | |
| 4,489,615 | 12/1984 | Ward | 73/261 X |

Primary Examiner—Herbert Goldstein
Attorney, Agent, or Firm—James C. Wray

[57] ABSTRACT

A bearing-less positive displacement flowmeter is disclosed of the type having dual rotary pistons with inter-engaging blades. Bearing-less mounting of the rotary pistons is established by making the pistons out of sleeve bearing material and having them rotate about stainless steel shafts. The pistons are in tight clearance with the casing. Magnets on the piston blades interrupt the magnetic field of the front outside mounted pickup. The interrupted field results in a pulse, the frequency of which is a function of the RPM's of the pistons. Thus, the frequency is directly proportional to the flow rate.

13 Claims, 4 Drawing Figures

BEARING-LESS POSITIVE DISPLACEMENT FLOWMETER

BACKGROUND OF THE INVENTION

The invention relates to measuring or testing devices having rotating members, electrical circuits or electrical output means and pickup coils. More in particular, the invention relates to measuring or testing devices having rotors also called herein rotary pistons which rotate in chambers or cylinders which inter-engage.

The background art shows the use of inter-engaging rotary pistons and flowmeters, wherein electrical output is created using pickup coils. However, there is a need in this art for less complicated and more accurate measuring devices. U.S. Pat. No. 4,295,369 shows the use of inter-engaging rotary pistons utilizing a magnetic drive to generate the electrical pulse. This patent exemplifies the number of moving parts that is generally necessary to effect an accurate metering. In this example, magnets are used to drive other magnets which rotate a shaft which create the pulse.

Instead of magnets, often the inter-engaging rotary pistons are coupled to gearings which will effect a metering. U.S. Pat. No. 294,026 is one such example.

A need exists within this art for less moving parts and more accurate metering.

The problem's enumerated in the foregoing are not intended to be exhaustive, but are rather believed to be among many which may tend to impair the effectiveness of previously known meters. Other noteworthy problems may also exist; however, those presented above should be sufficient to demonstrate that the gear meter systems which appear in the art have not been all together satisfactory as the need to use smaller rotary piston meters has developed.

Recognizing the need for an improved arrangement for rotary piston flowmeters, it would be advantageous to provide rotary pistons which are mounted without bearings on fixed shafts thus eliminating the need for expensive bearings. Furthermore, it would be advantageous to have a flowmeter wherein the only moving parts are the rotary pistons. Moreover, there is no requirement for moving parts outside the case as the information is transmitted by means of the magnetic field's effect on the external pickup.

SUMMARY OF THE INVENTION

The invention is a primary flow sensing device which interfaces with any number of electronics packages that accept an AC sine wave pulse input and provides an analog or digital signal that can be conditioned to yield instantaneous flow rate (gallons per minute) and/or flow totalization (gallons).

The unit as it was fabricated consists of four major parts: the case or housing; the rotors (pair); and the front and rear covers. The housing or casing is an oblong shaped thick band having side located inlet and outlet openings such that water or any fluid to be measured may enter the housing on one side and leave the housing on the other side. The housing encloses the measuring room. The back cover to the housing is adapted to mount on the back rim of the casing with bolts and an O-ring seal for flush mounting. Projecting from the back cover and into the measuring space are two spaced stationary shafts preferably constructed of stainless steel. These shafts are structured to rotatably receive rotary pistons. Mounted upon the shafts are two rotary pistons having blades which intermesh. Since there are no bearings with which these rotary pistons are mounted on the shafts, the pistons must be fabricated of a good sleeve bearing type material such as UHMW polyethylene. The smooth stainless steel shaft and the piston contructed out of a good sleeve bearing type material eliminate the need for bearings. The rotary pistons are dimensioned such that when they are mounted on the stationary shafts, they are in continuous engagement with one another and at the same time they are each in a continuous dynamic sealing arrangement with the measuring chamber walls. The measuring chamber walls comprise the casing having side located inlet and outlet means, as well as the front and back covers.

Impregnated in each of the blades of each rotary piston is a magnet. Mounted on the front rim of the housing is the front cover which is connected to the front rim in the same manner as the back cover is connected to the back rim. Mounted on the outside of the front cover is a magnetic pickup which is placed in a position that permits it to react to each magnet on each blade as the blade passes by on the opposite wet side of the front cover, as the rotary pistons are driven by the flow of fluid.

The liquid enters the inlet nozzle of the casing and spins the rotary pistons, one clockwise and the other counter clockwise, as the liquid is carried in the pockets of the rotors, comprising the valleys between each blade and the inner surface of the case, to the outlet nozzle. The spinning of the blades causes the magnets mounted thereon to pass near the magnetic pickup mounted on the outside of the front cover. This creates an interrupted magnetic field which in turn generates AC voltage or a pulse in the pickup. The frequency of the pulse is a function of the RPM's of the rotary pistons which is directly related to the flow rate.

With tight clearance between the rotor blades and the case, the rotors and the covers, and the case covers bolted to the case with O-ring seals for flush mounting, the meter has very little slippage (virtually zero slippage on high viscosity materials) and has proven to be extremely reliable, accurate, and repeatable.

It is an object of the invention to provide a meter with only two moving parts.

It is another object of the invention to provide a meter having dual inter-engaging rotary pistons mounted on stationary shafts without the use of bearings.

It is another object of this invention to provide a device which maybe easily repaired.

DESCRIPTION OF THE PREFERRED EMBODIMENT

Figure 4:
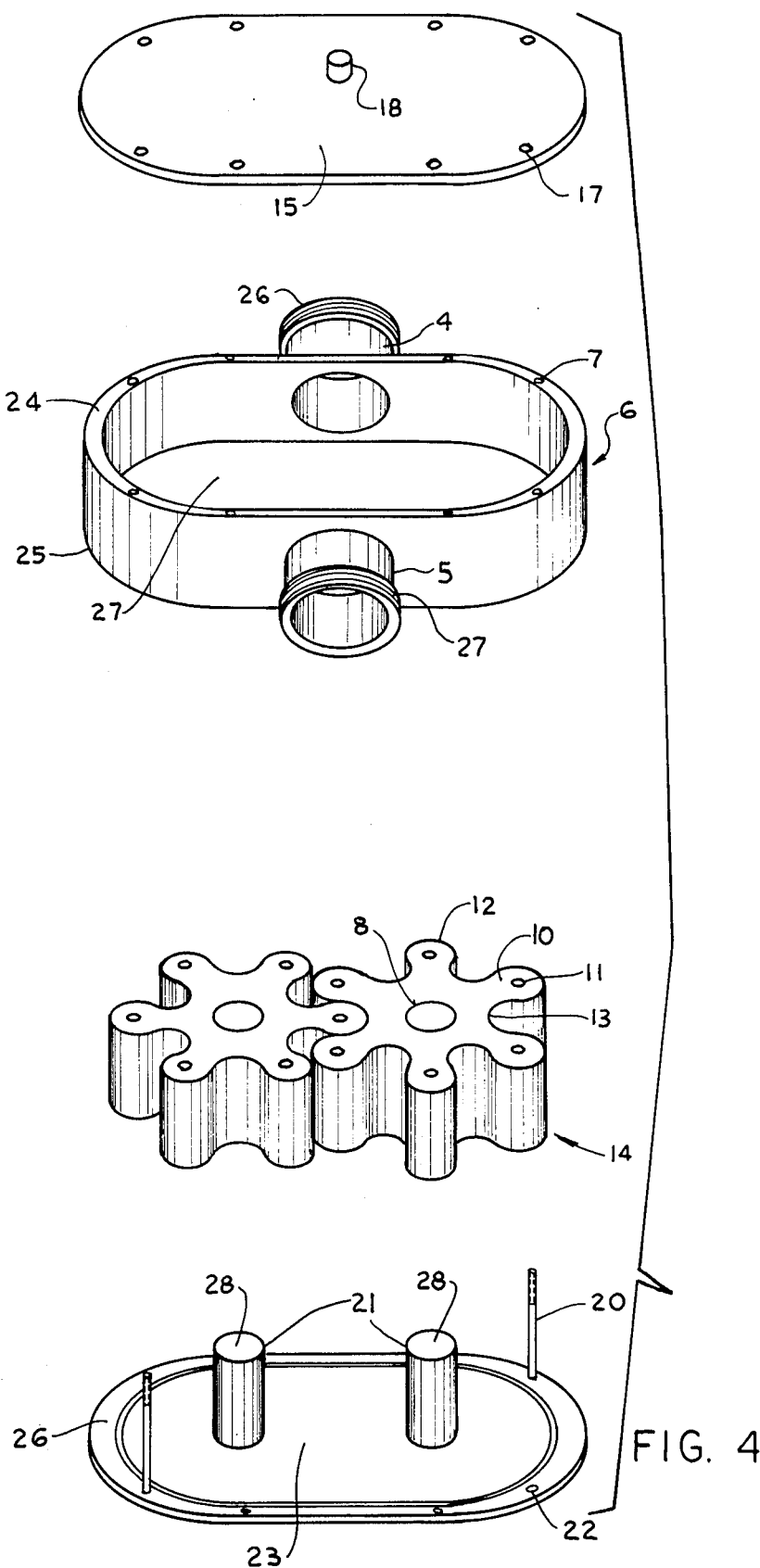
FIG. 4 is an exploded diagram showing the parts of the invention in the order in which they would be assembled.

Referring to FIG. 4, a casing 6 is provided which is a thick oblongated band preferably constructed of stainless steel. Inlet nozzle 5 and outlet nozzle 4 are located on sides of casing 6. A substantial length of those sides are parallel. The nozzles are provided with threads 26, 27 for connecting a fluid conduit (not shown). The casing 6 has opposite edges 24 and 25 for attachment of back cover 23 and front cover 15. The covers 23, 15 are attached to the edges by means of bolts 20. Channels or throughbores for receiving the bolts are spaced about the periphery of the covers and casing. The respective throughbores, 22, 7 and 17, are vertically aligned to receive the bolts.

Attached to the edge 25 is the back cover 23. An O-ring seal 23A is preferably recessed into cover 23 along periphery 26 prior to bolting to effect a flush mounted leakproof seal.

Stationary shafts 21 project perpendicularly from the plane of the back cover 23 and extend into the measuring chamber 27. It is preferred that the stationary shafts be constructed of stainless steel and be of a length sufficient to span the depth of the measuring chamber so that there is tight clearance between the distal ends 28 of the shafts 21 and the inside or wet side of the front cover 15.

Figure 1:
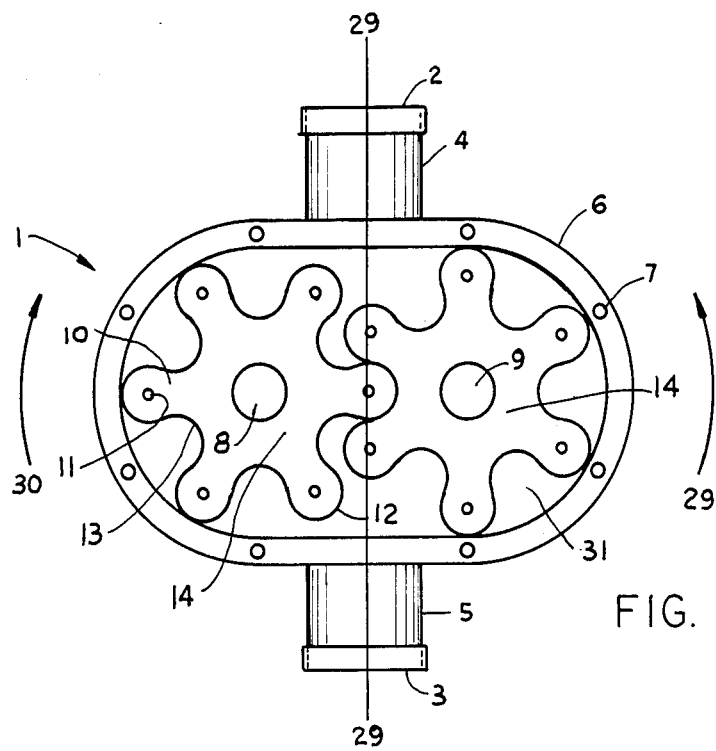
FIG. 1 is a plan view of the invention with the front cover removed.
Figure 2:
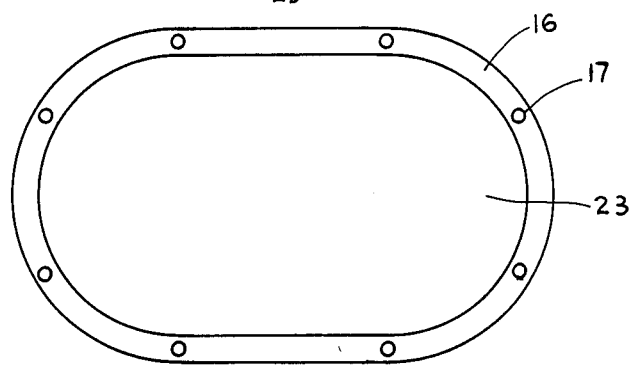
FIG. 2 is a plan view of the inside of the front cover.

Rotary pistons 14 are mounted on stationary shafts 21 by insertion of the shafts through central bores 8. Shafts 21 are spaced on back cover 23 to allow for the two rotary pistons to inter-engage as shown in FIG. 1. The rotary pistons have blades 10, vertices 12, and nadirs 13, defining valleys between the blades. Magnets 11 are embedded in the blades 10 near where the blades are in tight clearance with the front cover 15.

As shown in FIG. 1, the blades intermesh at points along line A—A. The blades of the rotary piston are likened to vanes on a windmill or waterwheel. The piston's depth corresponds to the depth of the measuring chamber.

As shown, the pistons have six blades; however, the number of blades varies with the size of the chamber. The pistons 14 are adapted to rotate with minimal resistance about stationary shafts 21 without the use of bearings. This is effected by constructing the pistons out of a good sleeve bearing material. A good example of sleeve bearing material is UHMW polyethylene. It is conceivable that just the throughbore 8 be lined with the material in order to effect minimal resistance bearing-less mounting.

Front cover 15 is mounted on casing 6 in the same manner as is the back cover 23. On the outside surface of cover 15 is a magnetic pickup 18. The marketplace provides a number of pickups which will suffice. The pickup should be located on the dry side of cover 15 opposite a point on the wet side where magnets 11 rotate.

Figure 3:
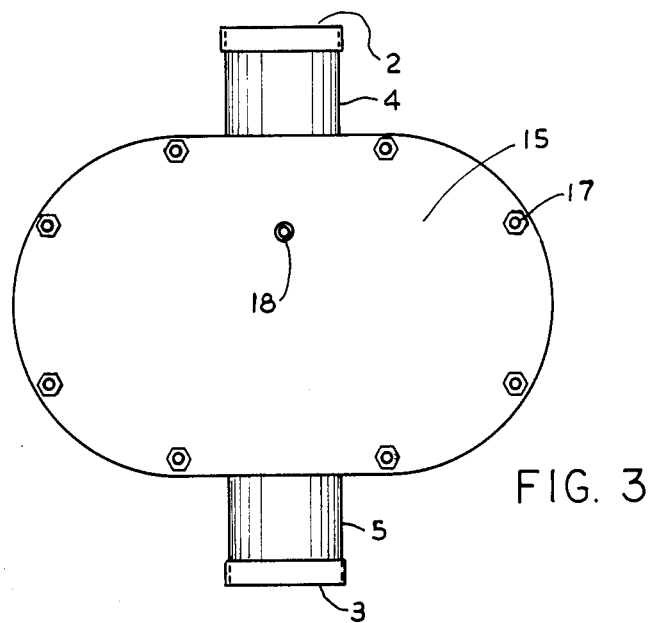
FIG. 3 is a plan view of the fully assembled invention.

FIG. 3 shows the device fully assembled.

Referring now to FIG. 1, the function of the bearingless positive displacement flowmeter will now be described. For the sake of illustration, I will refer to nozzle 5 as the inlet nozzle and nozzle 4 as the outlet nozzle. As can be readily seen, the device 1 is symetrical, making the designation of inlet and outlet arbitrary. Fluid is flowed into nozzle 5 which has a longitudinal bore extending therethrough. Fluid enters the measuring chamber where it seeks a path of least resistance causing the pistons 14 to rotate in the direction indicated by arrows 29 and 30. Since the pistons are in tight clearance with the casing and covers, the fluid fills into the valleys 31. The valleys, rotating with the blades 10, empty their contents near the outlet nozzle 4. The inter-engaging pistons further forces fluid out near outlet nozzle 4. The outlet nozzle 4 is constructed just like the inlet nozzle 5. There is an end 2 having external threads for threadably engaging fluid conduit means (not shown).

As the rotating pistons 14 rotate about stationary shafts 21, magnets 11 interrupt the magnetic field of pickup 18. The interrupted magnetic field creates an AC voltage or pulse in the pickup, the frequency of which is the function of the RMP's of the rotary pistons which is directly proportional to the flow rate. The pulse may be interfaced with any number of electronics packages that accepts an AC sine wave pulse input and provides an analog or digital signal that can be conditioned to yield instantaneous flow rates, e.g. gallons per minute, and/or flow totalization, e.g. gallons. With tight clearance between the rotary piston blades and the case, the rotary pistons and the covers and with the case covers bolted to the case with O-ring seals for flush mounting, the meter has very little slippage. There is virtually no slippage on high viscosity materials such as orange concentrate. The meter has proven extremely reliable, accurate, and repeatable. For high accuracy at extremely low flow rates, the magnetic pickup can be replaced with a magnetic reed switch (or electronic switch). Each time a lobe magnet triggers the switch at the common point a counter/totalizer circuit can be activated to provide total flow volume. The Hall Effect Sensor is a good example of a slow revolution counter. It is an electronic magnetic switching device similar to a transistor in that a switching occurs when a magnet is juxtaposed.

The casing, front and back covers may be molded, machined or stamped. Stainless steel is the preferred material. The rotary pistons may be molded using a polyolefin such as UHMW polyethylene or polytetrafluoroethylene. The unit may also be constructed without shafts or at least with reduced shafts. The reduced shafts do not extend all the way through the rotary pistons. It is because of precision metering that the shafts may be reduced or eliminated in their entirety. The reduced shafts are simply a cylindrical protrusion from the cover for the purpose of centering and aligning the rotors.

It should be noted that a wide range of materials may be used in the construction of the invention. It is preferred that the rotary pistons and casing be of different materials to allow for problems such as temperature expansions, etc.

In situations where temperatures are moderate, plastics may be used to construct the casing. Polyvinylchloride and Dupont Product DELRON are suitable materials.

It is to be understood that while a specific embodiment has been particularly described, deviations from the preferred embodiment may occur that fall within the ambit of the claims which set out the spirit and scope of my invention.

What I claim is:

1. A fluid metering apparatus comprising,
   a chamber comprising an oblated chamber having two opposed radiused portions separated by two opposed linear portions and
   first and second flat end plates connected to opposite end faces of the oblated chamber,
   a fluid inlet disposed in one of the two opposed linear portions of the oblated chamber,
   a fluid outlet disposed in the other of the two linear portions of the oblated chamber, the inlet and outlet having an axis bisecting the chamber, two non-metallic intermeshing rotors, each having a plurality of singly radiused lobes equidistantly spaced apart by singly radiused nadirs, rotatably mounted within the chamber in intermeshed relationship between the first and second flat plates, the rotors having overall radii corresponding to the radiused portions of the oblated chamber and the radiused lobes being in the radiused portion of the oblated chamber, and intermeshing at a point near a center of the chamber, whereby fluid entering the chamber through the inlet causes the lobes of corresponding rotors to move in a rotary direction, marker means, disposed in each of the plurality of lobes, and single pickup and indicating means, on a plate in the center of the chamber adjacent the marker means, and responsive to the marker means in both rotors for picking up passage of the markers and for indicating a quantity of electrical signals for both lobe means, the quantity being determined proportionate to rotational speed of the two rotors, said chamber acting as a guide for said rotors and restricting each to rotary movement.

2. The apparatus of claim 1 wherein the marker means are magnetic markers.

3. The apparatus of claim 1 wherein each rotor further comprises a hub having a central bore extending therethrough, and a parallel shaft extending inward from one plate through each bore.

4. The apparatus of claim 1 including mounting means comprising two stationary shafts mounted on one plate, wherein said shafts are perpendicular to the plane of the plate.

5. The apparatus of claim 4 wherein said shafts are constructed out of stainless steel.

6. The apparatus of claim 1 wherein each rotor further comprises a hub having a throughbore extending therethrough for receiving a shaft.

7. The apparatus of claim 6 wherein said rotors are rotatably mounted on stationary shafts extending from one of the plates through said throughbores.

8. The apparatus of claim 7 wherein said stationary shafts are sufficiently spaced apart such that two rotors mounted thereon may rotate freely about said shafts while at the same time cooperating.

9. The apparatus of claim 1 wherein said rotors are constructed out of sleeve bearing material.

10. The apparatus of claim 9 wherein said sleeve bearing material is UHMW polyethylene.

11. The apparatus of claim 1 wherein said marker means further comprises magnets embedded near a vertex of each lobe.

12. The apparatus of claim 11 wherein the pickup means comprises magnetic pickup and indicating means, located on said outside surface of a plate for picking up the passage of the magnets and for indicating a flow rate based electrical signal.

13. The apparatus of claim 1 wherein said plates are bolted to the respective faces of the chamber with O-ring seals for flush mounting.

* * * * *